United States Patent [19]
Shibahata

[11] Patent Number: 5,497,845
[45] Date of Patent: Mar. 12, 1996

[54] POWER TRANSMITTING SYSTEM FOR VEHICLE

[75] Inventor: Yasuji Shibahata, Wako, Japan

[73] Assignee: Honda Giken Kogyo Kabushiki Kaisha, Tokyo, Japan

[21] Appl. No.: 285,557

[22] Filed: Aug. 3, 1994

[30] Foreign Application Priority Data

Aug. 5, 1993 [JP] Japan ................................. 5-194567

[51] Int. Cl.⁶ .................................................. B60K 17/20
[52] U.S. Cl. ........................... 180/76; 180/233; 180/247
[58] Field of Search ............................. 180/76, 242, 243, 180/233, 247; 74/66 ST

[56] References Cited

U.S. PATENT DOCUMENTS 5,353,889  10/1994  Hamada ..................................... 180/76

Primary Examiner—Mitchell J. Hill
Attorney, Agent, or Firm—Armstrong, Westerman, Hattori, McLeland & Naughton

[57] ABSTRACT

In a power transmitting system for distributing a torque to left and right driving wheels in a front engine and front drive vehicle, a transmission is connected to one end of an engine which is horizontally disposed at a front portion of a vehicle body, and a planetary gear type differential is disposed in a space provided in the rear of the transmission. A first clutch and a second clutch are disposed laterally side by side in a space provided in the rear of the engine for controlling the torque transmitted to left and right front wheels by increasing and transmitting the rotation of a ring gear, which is an input member of the differential, to a left axle or a right axle. Thus, the pair of left and right clutches, added to the differential, can be rationally disposed by effective utilization of the spaces.

3 Claims, 5 Drawing Sheets

POWER TRANSMITTING SYSTEM FOR VEHICLE

BACKGROUND OF THE INVENTION

1. Field of the Invention

The present invention relates to a power transmitting system for a vehicle, including a pair of clutches added to a differential, whereby the torque is distributed to left and right driving wheels at a predetermined ratio.

DESCRIPTION OF THE PRIOR ART

In general, a differential provided in a power transmitting system for a vehicle is arranged to absorb a difference in speed produced between the left and right wheels during turning of the vehicle and equally distribute the torque of an engine to such left and right wheels. However, it is desirable that, when the vehicle is traveling at a mean or lower speed, a larger amount of torque is distributed to the wheel which is an outer wheel during turning of the vehicle, and when the vehicle is traveling at a higher speed, a larger amount of torque is distributed to the wheel which is an inner wheel during turning of the vehicle, thereby enhancing the travel stability.

Thereupon, a power transmitting system for a vehicle has been already proposed by the present applicant, in which a differential is positively controlled on the basis of a rotational angle of a steering wheel and a vehicle speed, so that a torque, suitable for a now operational condition, is distributed to left and right wheels (see Japanese Patent Application laid-open No. 182127/89).

However, such power transmitting system is constructed so that the distribution of the torque is carried out by a pair of clutches provided on laterally opposite sides of the differential and for this reason, when this power transmitting system is applied to a front engine and front drive vehicle, the following problem is encountered:

In the front engine and front drive vehicle, with an engine horizontally disposed therein, the differential is provided in the rear of a transmission connected to one end of the engine. Hence, if the pair of clutches are intended to be disposed on the laterally opposite sides of the differential, offset in a lateral direction from a center line of a vehicle body, a space for disposition of one of the clutches is insufficient.

SUMMARY OF THE INVENTION

Accordingly, it is an object of the present invention to provide a power transmitting system for a vehicle, in which a pair of clutches are disposed for effective utilization of space.

To achieve the above object, according to the present invention, there is provided a power transmitting system for a vehicle, comprising a planetary gear type differential comprised of a ring gear connected to an input shaft, a sun gear connected to a first output shaft for driving one of left and right wheels, and a planetary carrier which rotatably carries planetary gears meshed with the ring gear and the sun gear and which is connected to a second output shaft which drives the other of the left and right wheels; a first rotatable member disposed closer to the first output shaft than to the differential and connected to the ring gear; a second rotatable member disposed closer to the first output shaft than to the differential and connected to the planetary carrier; a first clutch for interconnecting the first rotatable member and the first output shaft; and, a second clutch for interconnecting the first rotatable member and the second rotatable member.

With the above arrangement, the planetary gear type differential is provided and the first rotatable member connected to the ring gear and the second rotatable member are disposed on a lateral one side of the differential in which the first output shaft extends. The first rotatable member and the first output shaft are interconnected by the first clutch, and the first rotatable member and the second rotatable member are interconnected by the second clutch, thereby performing the distribution of a torque. Therefore, both the clutches can be arranged together in a compact layout on one side of the differential.

In addition, according to the present invention, there is provided a power transmitting system for a vehicle, comprising a planetary gear type differential which is comprised of a ring gear connected to an input shaft, a sun gear connected to a first output shaft for driving one of left and right wheels, and a planetary carrier which rotatably carries planetary gears meshed with the ring gear and the sun gear and which is connected to a second output shaft which drives the other of the left and right wheels; a rotatable member disposed closer to the first output shaft than to the differential and connected to the planetary carrier; a first clutch for transmitting a torque from the first output shaft to the rotatable member; and, a second clutch for transmitting a torque from the rotatable member to the first output shaft.

With the above arrangement, the planetary gear type differential is provided, and the rotational member, connected to the planetary carrier, is disposed on a lateral one side of the differential in which the first output shaft extends, so that a torque is transmitted from the first output shaft to the rotatable member by the first clutch, while a torque is transmitted from the rotatable member to the first output shaft by the second clutch. Therefore, both the clutches can be arranged together in a compact layout on one side of the differential.

In addition to the above feature, the power transmitting system further may include a transmission connected to one end of an engine which is horizontally disposed in a vehicle body. The differential may be disposed in a space provided in the rear of the transmission, and the first and second clutches may be disposed side by side in a space in the rear of the engine.

With the above arrangement, the spaces provided in the rear of the engine and the transmission can be effectively utilized, particularly in a front engine and front drive vehicle or a mid-engine and rear drive vehicle.

The above and other objects, features and advantages will become apparent from a consideration of the following description of the preferred embodiments taken in conjunction with the accompanying drawings.

DESCRIPTION OF THE PREFERRED EMBODIMENT

The present invention will now be described by way of preferred embodiments in connection with the accompanying drawings.

Figure 1:
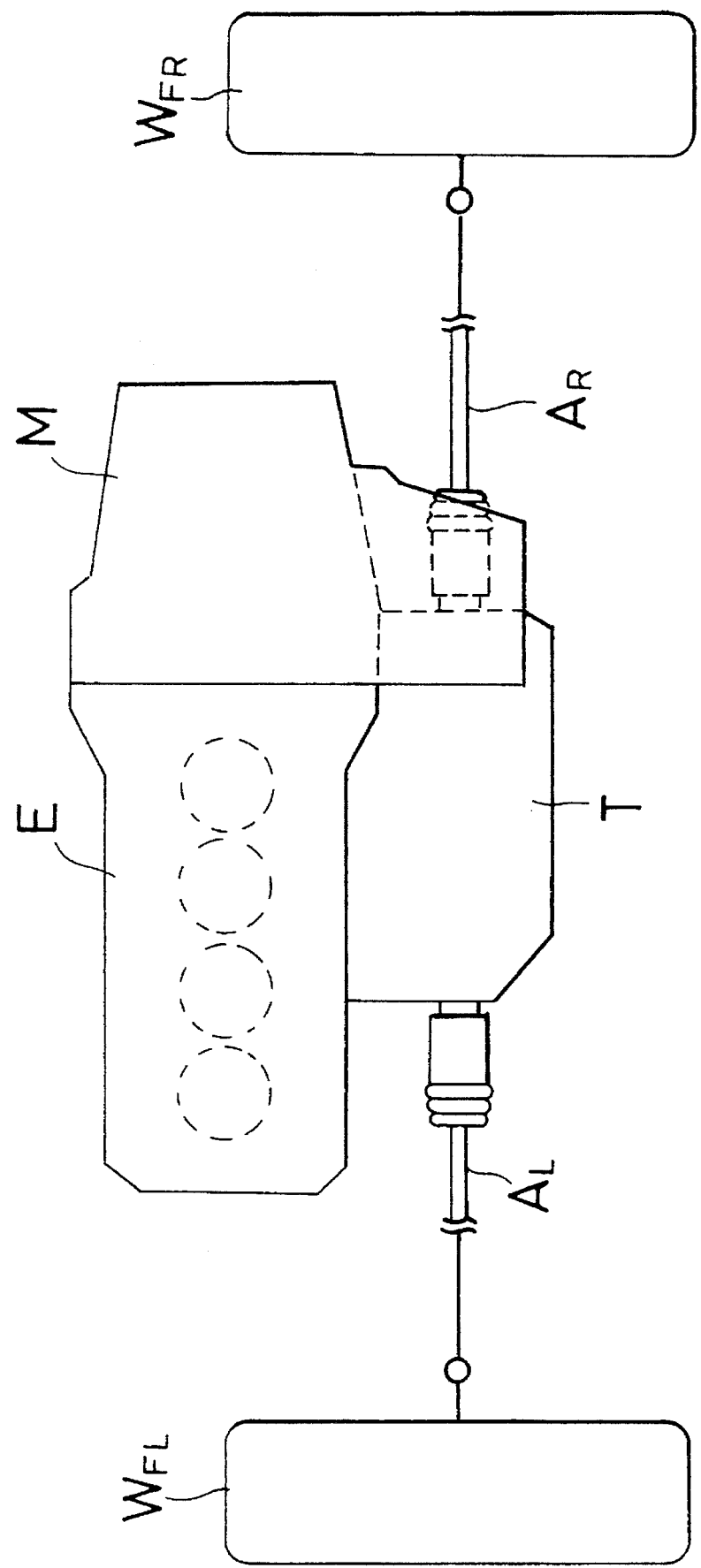
FIG. 1 is a diagrammatic partial plan view of a front engine and front drive vehicle.

Referring to FIG. 1, transmission M is connected to a right end of an engine E, horizontally disposed at a front portion of a vehicle body, and a torque distributing device T, which will be described hereinafter, is disposed in rear of the engine E and the transmission M. A left front wheel $W_{FL}$ and a right wheel $W_{FR}$ are connected to a left axle $A_L$ and a right axle $A_R$ which extend laterally from left and right ends of the torque distributing device T, respectively.

Figure 2:
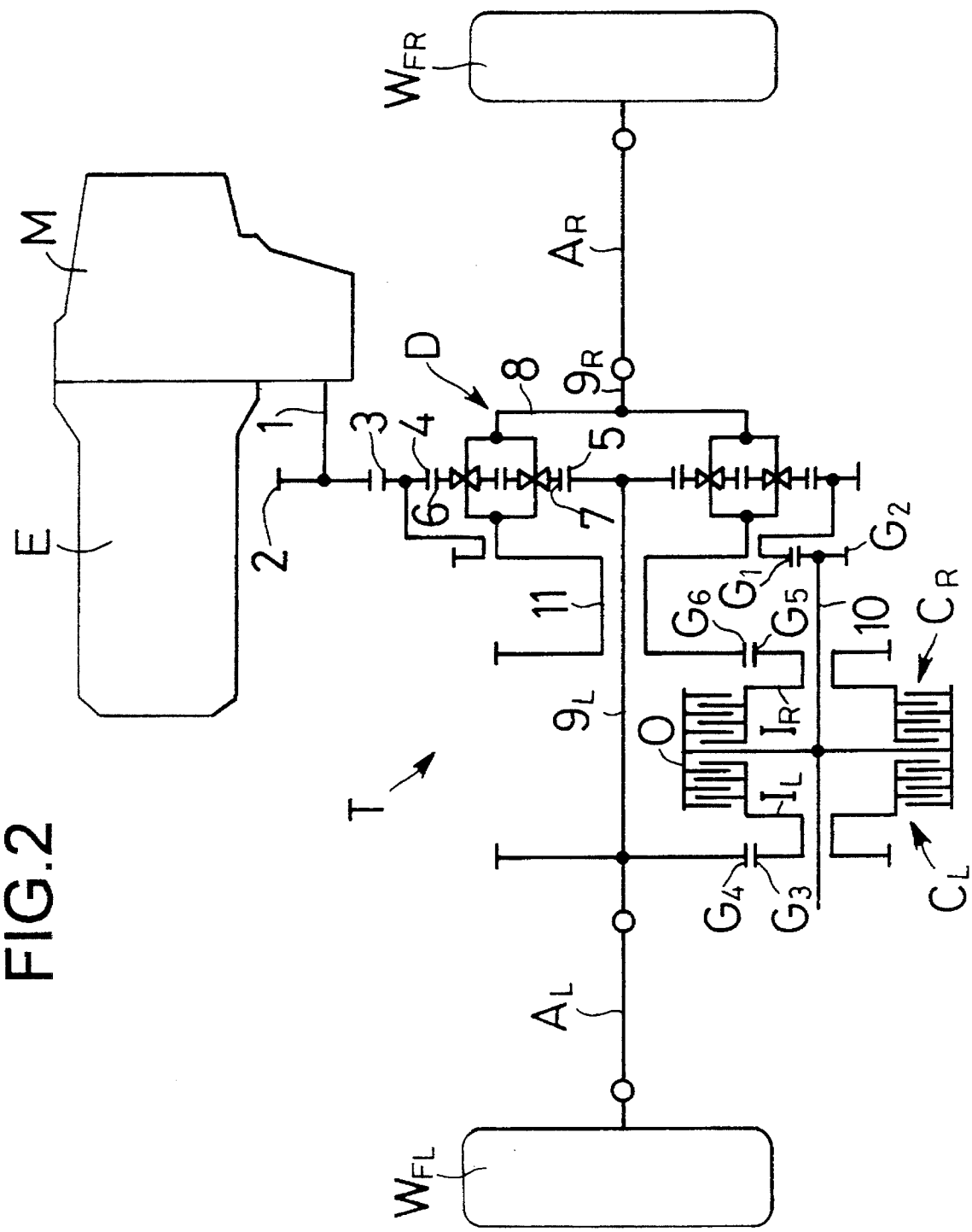
FIG. 2 is a diagram illustrating a power transmitting system in the front engine and front drive vehicle.

As shown in FIG. 2, the torque distributing device T includes a planetary gear type differential D, a first clutch $C_L$ and a second clutch $C_R$. An input gear 2 is provided on an input shaft 1 extending from the transmission M to supply an output from the transmission M to the differential D. The differential D is comprised of a ring gear 4 having, on an outer periphery thereof, an external-tooth gear 3 meshed with the input gear 2 of the input shaft 1, a sun gear 5 coaxially disposed within the ring gear 4, and a planetary carrier 8 which carries an outer planetary gear 6, meshed with the ring gear 4, and an inner planetary gear 7 meshed with the sun gear 5 in a mutually meshed relation. In the differential D, the ring gear 4 functions as an input element, while the sun gear 5, functioning as one of output elements, is connected to the left front wheel $W_{FL}$ through the first output shaft $9_L$, and the planetary carrier 8 functioning as the other output element is connected to the right front wheel $W_{FR}$ through the second output shaft $9_R$.

A first additional shaft 10, as a first rotatable member, is disposed adjacent the first output shaft $9_L$, and a first gear $G_1$ provided on the ring gear 4 is meshed with a second gear $G_2$ provided on the first additional shaft 10. A first clutch inner member $I_L$ and a second clutch inner member $I_R$ are coaxially fitted over an outer periphery of the first additional shaft 10, and a clutch outer 0 is secured to the first additional shaft 10 to cooperate with both the clutch inner members $I_L$ and $I_R$. A third gear $G_3$ provided on the first clutch inner $I_L$, is meshed with a fourth gear $G_4$, provided on the first output shaft $9_L$, and a fifth gear $G_5$, provided on the second clutch inner $I_R$, is meshed with a sixth gear $G_6$ which is provided on a second additional shaft 11 as a second rotatable member provided integrally with the planetary carrier 8 and coaxially fitted over the first output shaft $9_L$.

Thus, if the first clutch $C_L$ is brought into an engaged state, the clutch outer member 0 and the first clutch inner member $I_L$ are coupled to each other, thereby permitting the rotation of the ring gear 4 of the differential D to be transmitted through the first gear $G_1$, the second gear $G_2$, the first additional shaft 10, the clutch outer member 0, the first clutch inner member $I_L$, the third gear $G_3$ and the fourth gear $G_4$ to the first output shaft $9_L$. If the second clutch $C_R$ is brought into an engaged state, the clutch outer member 0 and the second clutch inner member $I_R$, are coupled to each other, thereby permitting the rotation of the ring gear 4 of the differential D to be transmitted through the first gear $G_1$, the second gear $G_2$, the first additional shaft 10, the clutch outer member 0, the first clutch inner member $I_R$, the fifth gear $G_5$, the sixth gear $G_6$, the second additional shaft 11 and the planetary carrier 8 to the second output shaft $9_R$.

The number $N_1$ of the teeth of the first gear $G_1$, the number $N_2$ of teeth of the second gear $G_2$, the number $N_3$ of teeth of the third gear $G_3$ and the number $N_4$ of teeth of the fourth gear $G_4$ are set such that a relation, $(N_1/N_2) \times (N_3/N_4) > 1$ is established, i.e., the rotation of the ring gear 4 is increased and transmitted to the first output shaft $9_L$, so that the torque of the ring gear 4 is transmitted to the first output shaft $9_L$. Likewise, the number $N_1$ of teeth of the first gear $G_1$, the number $N_2$ of teeth of the second gear $G_2$, the number $N_5$ of teeth of the fifth gear $G_5$ and the number $N_6$ of teeth of the sixth gear $G_6$ are set such that a relation, $(N_1/N_2) \times (N_5/N_6) > 1$ is established, i.e., the rotation of the ring gear 4 is increased and transmitted to the second output shaft $9_R$, so that the torque of the ring gear 4 is transmitted to the second output shaft $9_R$.

The operation of the first embodiment of the present invention, having the above-described construction, will be described below.

When the differential D is caused to exhibit a normal differential function, the first clutch $C_L$ and the second clutch $C_R$ are brought into their disengaged state. Thus, the planetary gear type differential D exhibits a well-known differential function, so that a difference between the speeds of the inner and outer wheels during turning of the vehicle is absorbed, and the torque of the engine E is equally distributed to the left and right front wheels $W_{FL}$ and $W_{FR}$.

When the vehicle is traveling at a mean or lower speed, the turning performance of the vehicle can be enhanced by increasing the torque distributed to the outer wheel during turning of the vehicle to a level larger than the torque distributed to the inner wheel, thereby providing enhancement. For example, when the vehicle is turned clockwise, a larger amount of torque can be distributed to the left front wheel $W_{FL}$, which is the outer wheel during the turning, by bringing the first clutch $C_L$ into its engaged state. More specifically, the engagement of the first clutch $C_L$ permits the rotation transmitted from the input shaft 1 to the ring gear 4 of the differential D to be increased and transmitted through the first gear $G_1$, the second gear $G_2$, the first additional shaft 10, the clutch outer member 0, the first clutch inner member $I_L$, the third gear $G_3$ and the fourth gear $G_4$ to the first output shaft $9_L$, as described above. On the other hand, by the fact that the number of revolutions of the first output shaft $9_L$ (i.e., the number of revolutions of the sun gear 5) is increased to a level larger than the number of revolutions of the ring gear 4, the number of revolutions of the second output shaft $9_R$ (i.e., the number of revolutions of the planetary carrier 8) is decreased to a level smaller than the number of revolutions of the ring gear 4 and as a result, the left front wheel $W_{FL}$ which is the outer wheel during the turning is increased in speed, while the right front wheel $W_{FR}$ which is the inner wheel during the turning is reduced in speed.

Thus, the torque of the engine E is transmitted to the wheel with the larger number of revolutions and hence, the proportion of torque distributed to the left front wheel $W_{FL}$, which is the outer wheel during the turning, can be increased, thereby enhancing the turning performance of the vehicle during traveling at the mean or lower speed.

Likewise, when the vehicle is turned counterclockwise, during traveling at a mean or lower speed, the rotation of the ring gear 4 can be increased and transmitted through the first gear $G_1$, the second gear $G_2$, the first additional shaft 10, the clutch outer 0, the second clutch inner $I_R$, the fifth gear $G_5$, the sixth gear $G_6$, the second additional shaft 11 and the planetary carrier 8 to the second output shaft $9_R$, and the proportion of torque distributed to, the right front wheel $W_{FR}$, which is the outer wheel during the turning, can be increased to enhance the turning performance of the vehicle.

The proportions of torque distributed to the left and right wheels $W_{FL}$ and $W_{FR}$ can be adjusted properly by slipping the first and second clutches $C_L$ and $C_R$ to change the magnitude of engagement force.

When the vehicle is traveling at a higher speed, the travel stability of the vehicle can be enhanced by increasing the torque distributed to the inner wheel during turning of the vehicle to a level larger than the torque distributed to the outer wheel during the turning. In this case, if the vehicle is being turned clockwise, the second clutch $C_R$ may be brought into its engaged state, so that a larger amount of torque may be distributed to the right front wheel $W_{FR}$, which is the inner wheel during the turning of the vehicle. If the vehicle is being turned counterclockwise, the first clutch $C_L$ may be brought into its engaged state, so that a larger amount of torque may be distributed to the left front wheel $W_{FL}$ which is the inner wheel during the turning of the vehicle.

Thus, because the transmission M is connected to the right end of the engine E, horizontally disposed in the vehicle body; the differential D is disposed in the rear of the transmission M, and the first clutch $C_L$ and the second clutch $C_R$ are disposed laterally, in the rear of the engine E, the differential D and both the clutches $C_L$ and $C_R$ can be arranged in a compact layout by effectively utilizing the space provided in the rear of the engine E and the transmission M.

Figure 3:
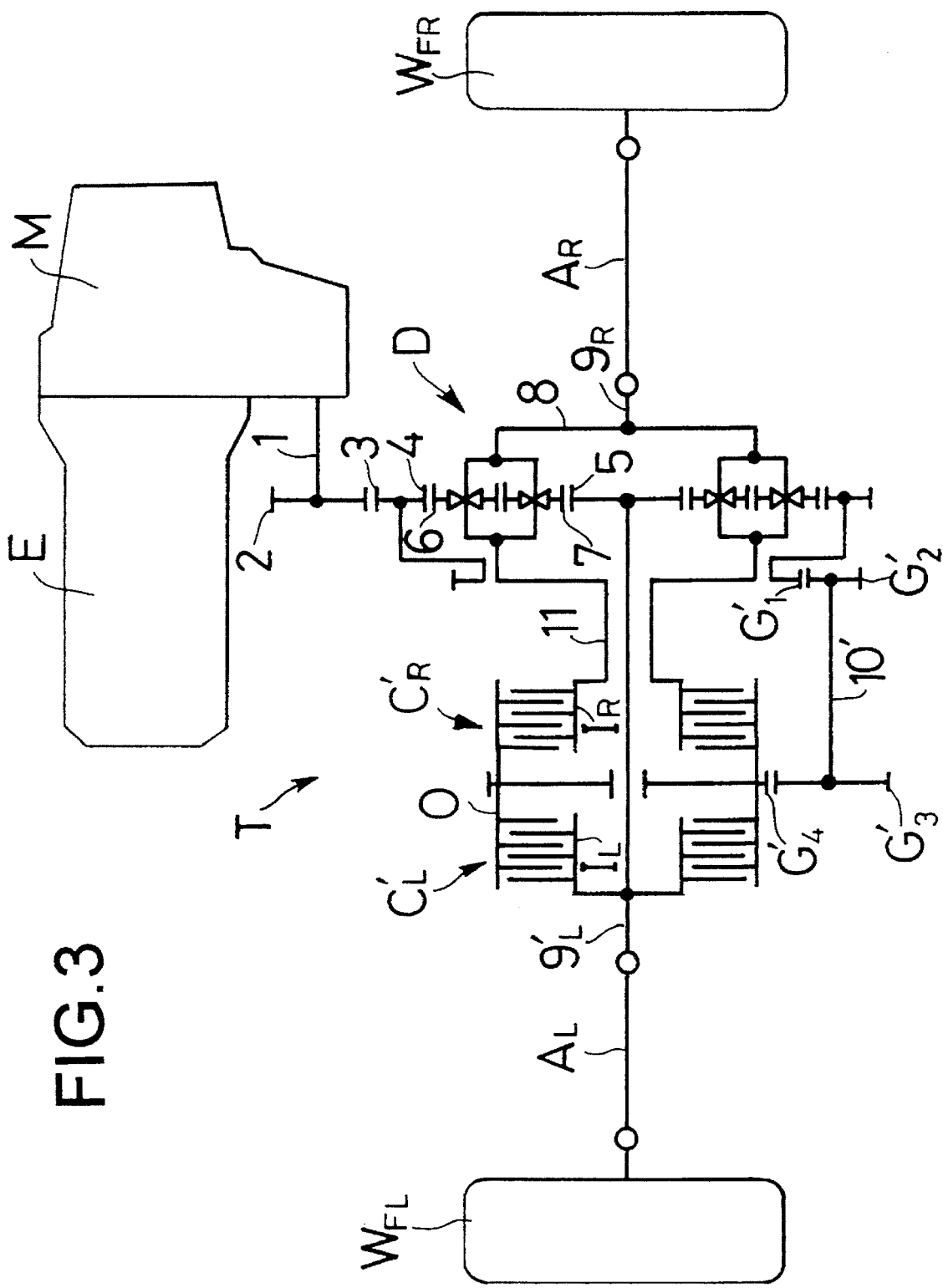
FIG. 3 is a diagram similar to FIG. 2, but illustrating a second embodiment.

A second embodiment of the present invention will now be described in connection wit FIG. 3. In the second embodiment, components corresponding to the those in the first embodiment are designated by the same reference characters.

In the second embodiment, a clutch outer member O' for first and second clutches $C'_L$ and $C'_R$ is coaxially carried on an outer periphery of a first output shaft $9'_L$, and a third gear G3, provided on a first additional shaft 10', is meshed with a fourth gear G4, provided on the clutch outer member O'. A first clutch inner member $I_L$ and a second clutch inner member $I_R$ are provided, respectively, on the first output shaft $9'_L$ and a second additional shaft 11 to cooperate with the clutch outer member 0'. In this case, the number $N_1$ of teeth of the first gear $G'_1$, the number $N_2$ of teeth of the second gear $G'_2$, the number $N_3$ of teeth of the third gear $G'_3$ and the number $N_4$ of teeth of the fourth gear $G'_4$ are set such that a relation, $(N_1/N_2) \times (N_3/N_4) > 1$ is established, so that the rotation of the ring gear 4 is increased and transmitted to the first output shaft $9_L$ or the second additional shaft 11.

Therefore, even in the second embodiment, the number of revolutions of the first output shaft $9'_L$ can be increased to increase the proportion of torque distributed to the left front wheel $W_{FL}$ by bringing the first clutch $C'_L$ into its engaged state, and the number of revolutions of the second additional shaft 11 (i.e., the second output shaft $9'_R$) can be increased to increase the proportion of torque distributed to the right front wheel $W_{FR}$ by bringing the second clutch $C_R$ into its engaged state. In addition, the first and second clutches $C'_L$ and $C_R$ can be arranged in a compact layout by effectively utilizing the space provided in rear of the engine E.

The first and second embodiments are accompanied by following advantages and disadvantages: In the second embodiment, the first and second clutches $C_L$ and $C_R$ are disposed coaxially with the first output shaft $9'_L$ and therefore, it is possible to reduce the radial size, as compared with the first embodiment in which both the clutches $C_L$ and $C_R$ are disposed outside of the first output shaft $9_L$. However, the number of revolutions of the first additional shaft 10 is larger than the number of revolutions of the first output shaft $9_L$ and the second additional shaft 11 (i.e., the second output shaft $9_R$) from the dimensional relationship among the first to sixth gears $G_1$ to $G_6$ first embodiment, first to fourth gears $G'_1$ to $G'_4$, second embodiment, and therefore, if the first and second clutches $C'_L$ and $C'_R$ of the second embodiment, are provided on the first additional shaft 10 as in the first embodiment, the capacity of the clutches $C_L$ and $C_R$ can be reduced to provide a reduction in size.

Figure 4:
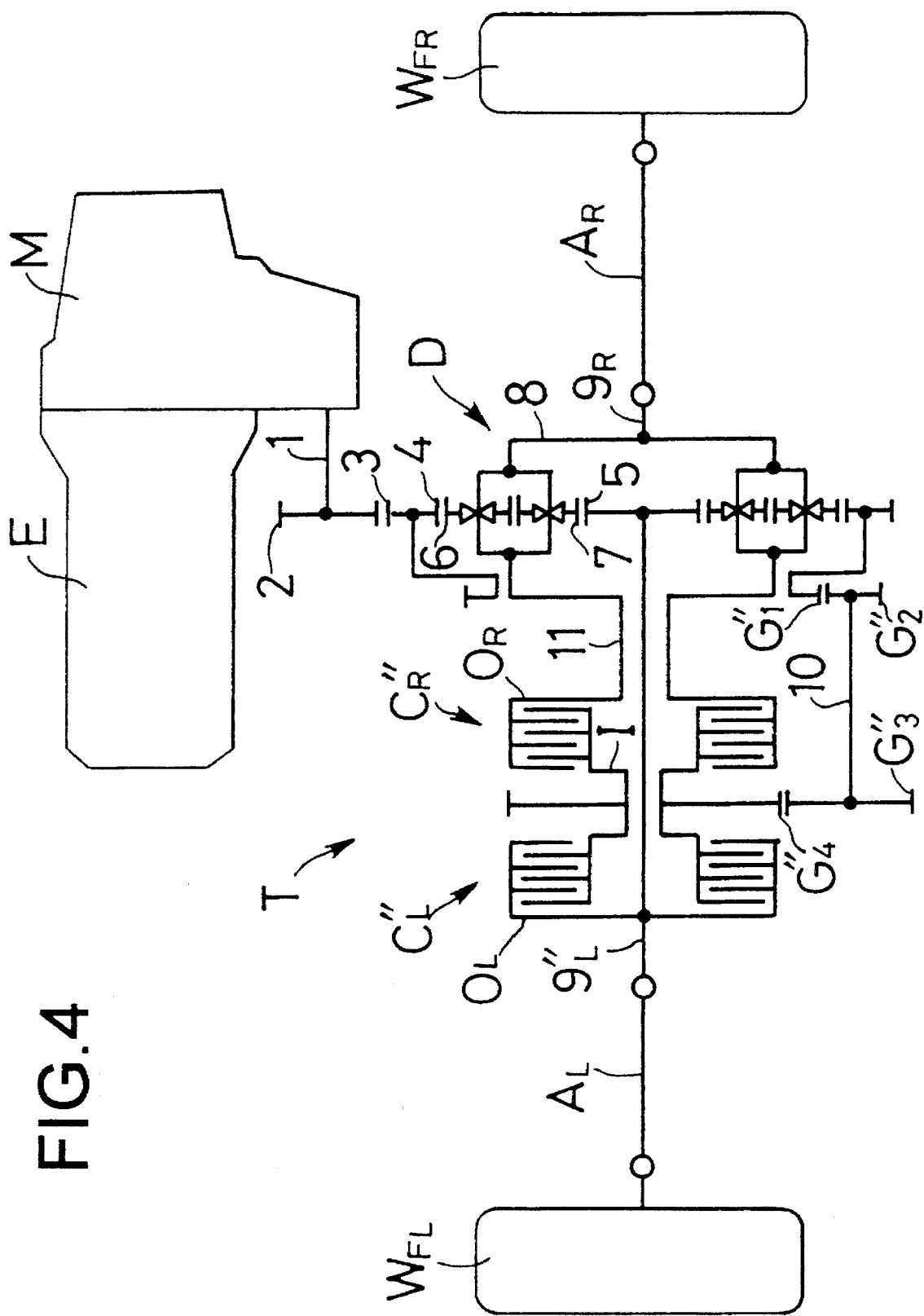
FIG. 4 is a diagram similar to FIG. 2, but illustrating a third embodiment.

A third embodiment of the present invention will now be described in connection with FIG. 4. In the third embodiment, components corresponding to those in the first and second embodiments are designated by the same reference characters.

In the third embodiment, a first clutch $C''_L$ and a second clutch $C'_R$ include a common clutch inner I which is fitted over an outer periphery of a first output shaft $9''_L$. A first clutch outer member $O_L$ is provided on the first output shaft $9''_L$ to cooperate with the clutch inner I, while a second clutch outer member $O_R$ is provided on a second additional shaft 11 to cooperate with the clutch inner I. The third embodiment corresponds to an embodiment in which the positional relationship between the clutch outer member and the clutch inner member in the second embodiment is replaced by a reverse positional relationship. In the third embodiment, an operational effect similar to that in the second embodiment can be provided.

Figure 5:
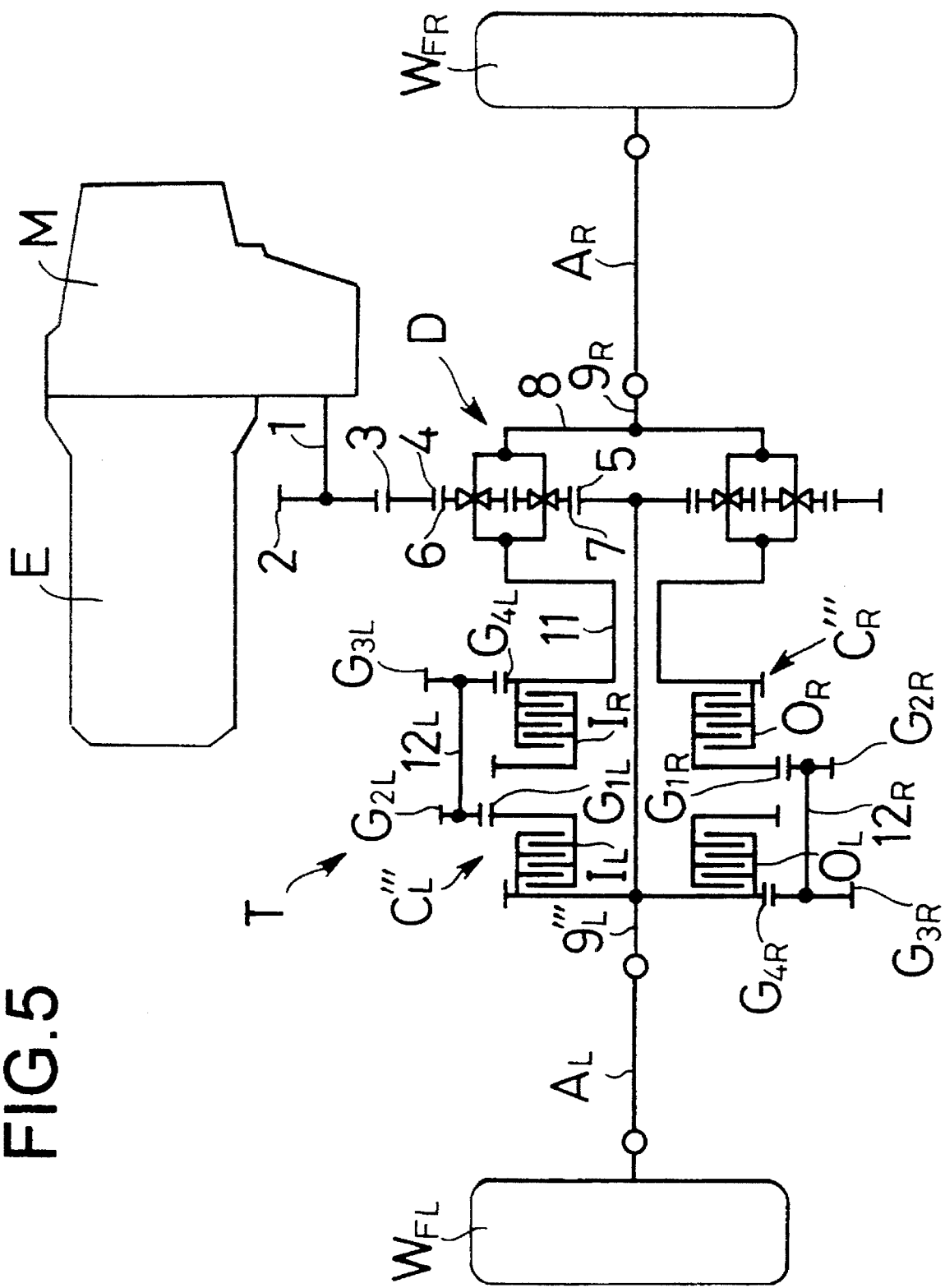
FIG. 5 is a diagram similar to FIG. 2, but illustrating a fourth embodiment.

A fourth embodiment of the present invention will be described below in connection with FIG. 5. In the fourth embodiment, components corresponding to those in the first to third embodiments are designated by the same reference characters.

In the fourth embodiment, a clutch outer member $O_L$ of a first clutch $C'''_L$ is secured to the first output shaft $9'''_L$, and a clutch inner member $I_L$ is relatively rotatably carried on the first output shaft $9'''_L$. A clutch outer member $O_8$ of a second clutch $C'''_R$ is secured to an additional shaft or rotatable member 11, integral with a second output shaft $9_R$ and a planetary carrier 8, and a clutch inner member $I_R$ is relatively rotatably carried on the first output shaft $9'''_L$.

The first speed-increasing shaft $12_L$ and a second speed-increasing shaft $12_R$ are disposed outside of the clutches $C'''_L$ and $C'''_R$ in parallel to the first output shaft $9'''_L$. A first gear $G_{1L}$, provided on the clutch inner member $I_L$ of the first clutch $C'''_L$ is meshed with a second gear $G_{2L}$ provided at one end of the first speed-increasing shaft $12_L$, and a third gear $G_{3L}$ provided at the other end of the first speed-increasing shaft $12_L$ is meshed with a fourth gear $G_{4L}$ provided on the clutch outer member $O_R$ of the second clutch $C'''_R$. A first gear $G_{1R}$ provided on the clutch inner member $I_R$ of the second clutch $C'''_R$ is meshed with a second gear $G_{2R}$ provided at one end of the second speed-increasing shaft $12_R$, and a third gear $G_{3R}$ provided at the other end of the second speed-increasing shaft $12_R$ is meshed with a fourth gear $G_{4R}$ provided on the clutch outer member $O_L$ of the first clutch $C'''_L$.

In this case, the number $N_1$ of teeth of the first gear $G_{1L}$, the number $N_2$ of teeth of the second gear $G_{2L}$, the number $N_3$ of teeth of the third gear $G_{3L}$ and the number $N_4$ of teeth of the fourth gear $G_{4L}$ are set such that a relation, $(N_1/N_2) \times (N_3/N_4) > 1$ is established, so that the rotation of the first output gear $9'''_L$ is increased and transmitted to the first additional shaft 11 (i.e., the second output shaft $9_R$). Likewise, the number $N_1$ of teeth of the first gear $G_{1R}$, the number $N_2$ of teeth of the second gear $G_{2R}$, the number $N_3$ of teeth of the third gear $G_{3R}$ and the number $N_4$ of teeth of the fourth gear $G_{4R}$ are set such that a relation, $(N_1/N_2) \times (N_3/N_4) > 1$ is established, so that the rotation of the additional shaft 11 (i.e., the second output shaft $9_R$) is increased and transmitted to the first output shaft $9'''_L$.

Therefore, if the first clutch $C'''_L$ is brought into its engaged state, the rotation of the first output shaft $9'''_L$ is increased and transmitted to the second output shaft $9_R$, and a portion $T_C$ of the torque of the left front wheel $W_{FL}$ is transmitted to the right front wheel $W_{FR}$. As a result, the torque $T_L(=T_0/2)$ of the left front wheel $W_{FL}$, which is one half of the total torque $T_0$ theretofore, is decreased down to a value $T_L(=T_0/2-T_C)$, while the torque $T_R(=T_0/2)$ of the right front wheel $W_{FR}$, which is one half of the total torque $T_0$ theretofore, is increased up to a value $T_R(=T_0/2+T_C)$. Likewise, if the second clutch $C'''_R$ is brought into its engaged state, the rotation of the second output shaft $9_R$ is increased and transmitted to the first output shaft $9'''_L$, and a portion $T_C$ of the torque of the right front wheel $W_{FR}$ is transmitted to the left front wheel $W_{FL}$. As a result, the torque $T_R$ of the right front wheel $W_{FR}$ is decreased down to a value $T_R(=T_0/2-T_C)$, while the torque $T_L$ of the left front wheel $W_{FL}$ is increased up to a value $T_L(=T_0/2+T_C)$.

Even in the fourth embodiment, the differential D and both the clutches $C'''_L$ and $C'''_R$ are arranged in a compact layout by effectively utilizing the space provided in the rear of the engine E and the transmission M. Moreover, the volume of the torque to be transmitted by the first or second clutch $C'''_L$ or $C'''_R$ need only be half of a difference in torque produced between the left and right front wheels $W_{FL}$ and $W_{FR}$. Thus, it is possible to reduce the capacity of the clutches $C'''_L$ and $C'''_R$ to provide a reduction in size.

Although the embodiments of the present invention have been described in detail, it will be understood that the present invention is not limited to these embodiments, and various modifications may be made without departing from the spirit and scope of the invention defined in the claims.

For example, the application of the present invention is not limited to the front engine and front drive vehicle which has been illustrated in the embodiments, and the present invention is also applicable to a mid-engine and rear drive vehicle.

The terms and expressions which have been employed in the foregoing description are used as terms of description and not of limitation, and there is no intention, in the use of such terms and expressions, of excluding any equivalents of the feature shown and described or portions thereof, but it is recognized that various modifications are possible within the scope of the invention claimed.

What is claimed:

1. A power transmitting system for a vehicle having left and right wheels, comprising a planetary gear type differential which is comprised of a ring gear connected to an input shaft, a sun gear connected to a first output shaft for driving one of said left and right wheels, and a planetary carrier which rotatably carries planetary gears meshed with said ring gear and said sun gear and which is connected to a second output shaft which drives the other of said left and right wheels;

a first rotatable member disposed closer to said first output shaft than to said differential and connected to said ring gear;

a second rotatable member disposed closer to said first output shaft than to said differential and connected to said planetary carrier;

a first clutch for interconnecting said first rotatable member and said first output shaft; and a second clutch for interconnecting said first rotatable member and said second rotatable member.

2. A power transmitting system for a vehicle having left and right wheels, comprising a planetary gear type differential which is comprised of a ring gear connected to an input shaft, a sun gear connected to a first output shaft for driving one of said left and right wheels, and a planetary carrier which rotatably carries planetary gears meshed with said ring gear and said sun gear and which is connected to a second output shaft for driving the other of said left and right wheels;

a rotatable member disposed closer to said first output shaft than to said differential and connected to said planetary carrier;

a first clutch for transmitting a torque from said first output shaft to said rotatable member; and a second clutch for transmitting a torque from said rotatable member to said first output shaft.

3. A power transmitting system for a vehicle according to claim 1 or 2, wherein said power transmitting system further includes a transmission connected to one end of an engine horizontally disposed in a vehicle body, said differential being disposed in a space in a rear of said transmission, and said first and second clutches being disposed side by side in a space in rear of said engine.

* * * * *